UNITED STATES PATENT OFFICE.

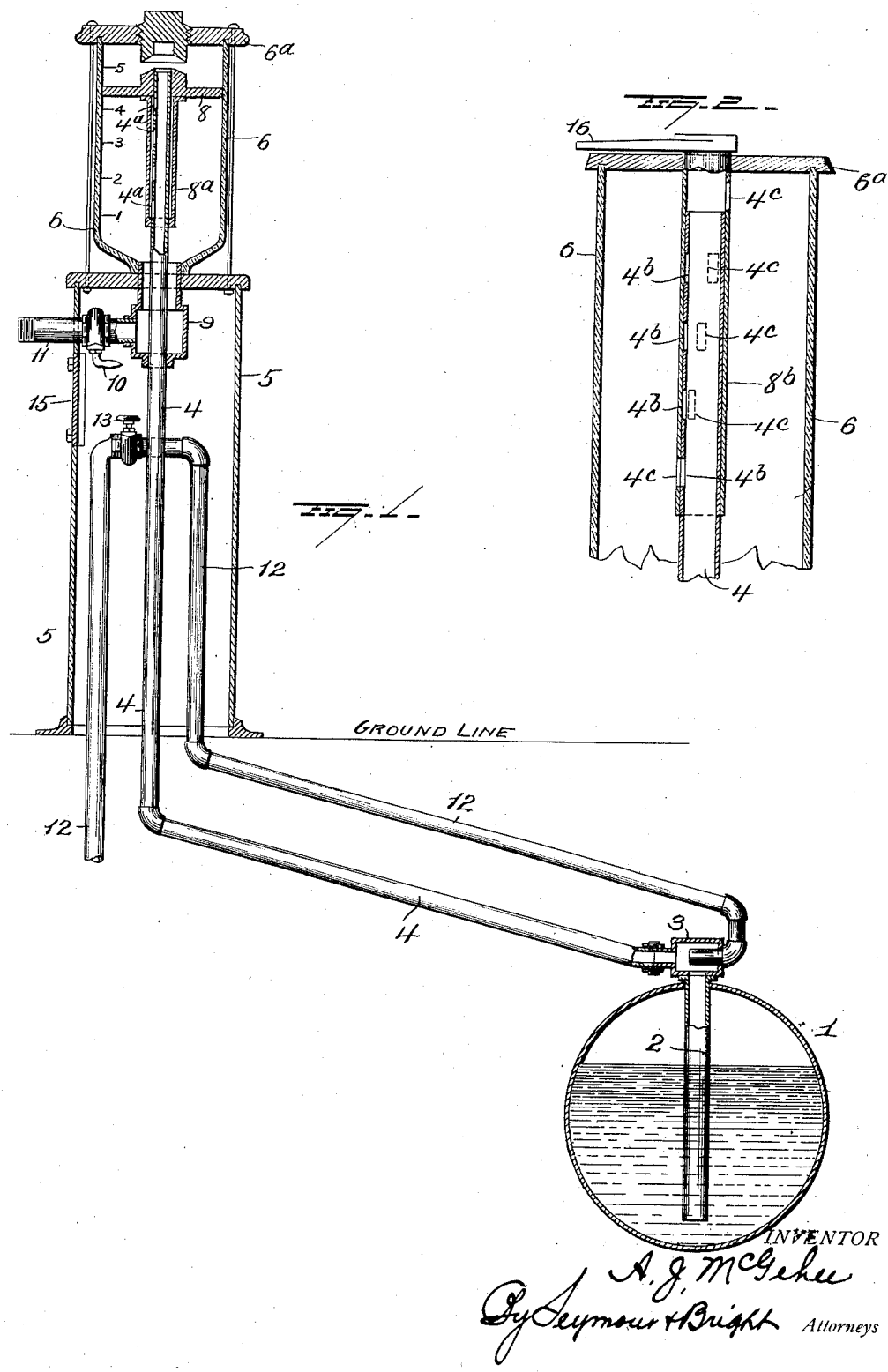

ABNER JUDSON McGEHEE, OF JACKSON, TENNESSEE.

GASOLENE SERVICE-TANK.

1,383,136.  Specification of Letters Patent.  Patented June 28, 1921.

Application filed September 26, 1919. Serial No. 326,426.

*To all whom it may concern:*

Be it known that I, ABNER J. MCGEHEE, a citizen of the United States, and a resident of Jackson, in the county of Madison and State of Tennessee, have invented certain new and useful Improvements in Gasolene Service-Tanks; and I do hereby declare the following to be a full, clear, and exact description of the invention, such as will enable others skilled in the art to which it appertains to make and use the same.

My invention relates to an improvement in gasolene service tanks, and is designed as an improvement on the construction disclosed in my application Serial No. 320,763 filed August 30th, 1919.

In the apparatus disclosed in my application above referred to, the coupling or injector connecting the gasolene and air pipes is located in a plane below the bottom of the tank, hence the said coupling and part of the air pipe are always filled with gasolene.

The object of this invention is to so arrange the parts that all the gasolene in the coupling and air pipe will drain back into the main reservoir as soon as the air pressure is cut off and to provide means for accurately delivering the desired number of gallons of gasolene, and it consists in the combination and arrangement of parts as will be more fully explained and pointed out in the claims.

In the accompanying drawings, Figure 1 is a view in vertical longitudinal section partly in elevation of my improved apparatus, and Fig. 2 is a view of a modification.

1 is the main reservoir, located in a pit underground, and 2 is a pipe entering said reservoir at the top and extending to near the bottom thereof. Secured to the upper end of pipe 2, and at a point outside of and in a plane above the tank 1 is the three way coupling 3, and leading from the coupling 3 at one end of the same is the gasolene pipe 4 which extends above the surface of the ground and is open at its upper end. Surrounding the open end of pipe 4 is the dispensing tank 6 preferably cylindrical in form and closed at its upper end by the head 6ª, which may have a vent therein for the escape of air which enters the tank with the gasolene.

8 is a float preferably perforated and located within the tank and provided with a central opening for the pipe 4 and with a depending sleeve 8ª having a sliding, but close fit with the pipe 4 so as to prevent the flow or passage of any appreciable quantity of gasolene between the said pipe and the sleeve 8ª. The pipe 4 extends up into the dispensing tank so as to form a guide for the float 8 throughout the entire movements of the latter, and it is provided at intervals with slots 4ª, the location and functions of which will be explained later on.

The tank 6 is supported on the stand 5 and is graduated to indicate the contents in gallons, and is made of glass or other transparent material, or is provided with an opening throughout its length covered with glass or other material, or with a sight tube, so that the height of the gasolene in the tank will be clearly visible and may be seen by the customers. This tank is seated on and secured to the stand 5 and is provided at its bottom with a reduced neck connected by a coupling 9 with the discharge pipe 11, to which the discharge hose (not shown) is attached, the pipe 11 being provided with a valve 10 for controlling the discharge of gasolene from the dispensing tank 6.

12 is a pipe leading from an air reservoir, compressor or other source of air under pressure. This pipe 12 passes upwardly in the stand 5 to a point within reach of the operator, and then downwardly into and within the three way coupling 3, the discharge end of the air pipe being in line with the end of the gasolene pipe 4 leading from the coupling and preferably terminating between the end of said pipe and the pipe 2 which latter connects the coupling 3 with the main tank 1. Pipe 4 is provided preferably at the point where it bends in casing 5, with the valve 13 which together with the valve 10 in the discharge pipe 11, will be accessible through the opening in the stand 5 closed by door 15, to the operator standing at the front of the apparatus, hence when the door 15 is closed and locked the manipulating valves will be concealed and inaccessible.

Pipe 4 passes through coupling 9 attached to the lower end of the dispensing tank 6, and through the restricted necks or opening in said tank, ample space however being left in the neck for the free descent of the sleeve 8ª and also the free passage of the gasolene to the discharge pipe 11.

The tank 6 is marked to indicate gallons, in the present instance five, and the pipe 4 is provided with a slot $4^a$ for each gallon mark and in the same plane as the latter. The sleeve $8^a$ should be of such length that when the tank 6 is empty the float 8 will be below the one gallon mark and below the slot $4^a$ in pipe 4 in the plane of the one gallon mark. Instead however of having a slot for each indicating mark on the tank, the upper open end of the pipe may be in line with the top mark or indication and operate as a slot, a slot being provided in the pipe for each of the lower indicating marks.

Normally the dispensing tank 6 and pipe 4 are empty and when air is let into the coupling 3 through pipe 12, it blows into pipe 2 and operating on the injector principle, draws gasolene up pipe 2 and forces it into and up through pipe 4 and into the dispensing tank, the operator, by the proper manipulation of valve 13, accurately controlling the flow of gasolene to the tank. As the gasolene flows into the tank the float begins to rise, and as it rises the sleeve $8^a$ covers successively the slots $4^a$ in pipe 4.

The greater number of customers take five gallons, but provision must be made for measuring and delivering a lesser number of gallons accurately, and this is done by the slots $4^a$ in the pipe 4 registering with the gallon marks on the tank. If for instance a customer wants three gallons, the valve 13 will be manipulated to admit air and the latter acting as previously described forces the gasolene into the dispensing tank through pipe 4, until the float reaches the three gallon mark. If it should go slightly above the bottom of the slot in the plane of the three gallon mark, the surplus will flow back through the said slot into pipe 4 which of course is freed of gasolene as soon as the air is withdrawn, and fall back into the tank 1, the gasolene in the dispensing tank filling the latter up to the bottom of the slot, the said bottom of the slot representing accurately the corresponding measure on the visible indicator.

The top of the pipe represents five gallons, hence if more should be forced in, all above the top would flow back as soon as the air pressure is shut off. It will be understood of course that as the float rises, the sleeve $8^a$ attached to the float covers all the slots below the latter, so that none of the gasolene in the tank 6 can escape back into pipe 4 through the slots below the float.

After the tank 6 has been charged with the proper amount of gasolene desired by the customer, the air is cut off and valve 10 opened thus permitting the gasolene or any part of it in the dispensing tank to flow into the tank on the automobile, or other receptacle.

With this apparatus it is only necessary, when it is desired to furnish a measured quantity of gasolene, for the operator to open the air valve 13, and when the tank 6 has been filled or partly filled further supply can be instantly stopped by shutting off the air.

In Fig. 2 I have illustrated another form of valve arrangement for disposing of any surplus gasolene that may be forced into the dispensing tank. In this latter construction the upper end of the pipe 4 represents the five gallon level in the tank, and the said pipe is provided with four slots $4^b$ arranged perpendicularly in the pipe, the topmost slot representing the four gallon level; the slot next below the three gallon level and so on down to the lowermost slot which represents one gallon level. The slotted part of the pipe 4 is surrounded by the sleeve $8^b$ which projects through the cover $6^a$ and is provided with a handle 16 by which the sleeve $8^b$ may be rotated or partly rotated, and this sleeve is provided with a series of slots $4^c$ one of which is in a plane above the open upper end of pipe 4, and the other in the same horizontal plane with the slots $4^b$ in the pipe, but are arranged in spiral form around said sleeve so that only one slot in the sleeve is in alinement with its respective slot in the pipe at a time, it being understood that the top slot in the sleeve being above the upper end of pipe 4 is always open to the said pipe so that all gasolene above the topmost slot may always, when the air pressure in pipe 4 is withdrawn, flow back into the said pipe.

From the foregoing it will be seen that by turning the handle 16 any one of the slots in the sleeve may be brought into register with its slot in the pipe, and when so adjusted, and oil is forced into the dispensing tank, it will fill the latter up to or above said slot, and all the gasolene above the slot will flow back into pipe 4 as soon as the flow of air is stopped thus leaving the desired amount of gasolene in the tank which may then be withdrawn through the pipe 11.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In a gasolene dispensing apparatus, the combination of a main tank, a dispensing tank, a three way coupling in a plane above the gasolene level in the main tank, a continuously open pipe leading from the main tank near the bottom thereof and connected with the coupling, a continuously open pipe leading from the coupling to the dispensing tank, a pipe leading from a source of compressed air and discharging into the coupling, a discharge pipe from the dispensing tank, a valve in the discharge pipe and a valve in the air pipe.

2. In a gasolene dispensing apparatus, the combination of a main tank, a dispensing tank, a three way coupling located in a plane above the top of the main tank, a continuously open pipe connection from the main tank to the coupling, a continuously open pipe leading from one end of the coupling to the dispensing tank and terminating within the latter, a pipe connected with a source of compressed air and discharging into the coupling through the end opposite the connection with the pipe leading to the dispensing tank, a discharge pipe connected with the dispensing tank, a valve in said pipe and a valve in the air pipe.

3. In a gasolene dispensing apparatus the combination of a dispensing tank, a main tank, a three way coupling located in a plane above the main tank, a continuously open inlet pipe leading from the main tank near the bottom thereof to the coupling between the ends of the latter, a continuously open outlet pipe leading from one end of the coupling to the dispensing tank, a pipe connected with a source of air under pressure and terminating within the coupling between the inlet and outlet pipes and in line with the latter, a discharge pipe connected with the dispensing tank, a valve in said discharge pipe and a valve in the air pipe.

4. In a gasolene dispensing apparatus, the combination of a dispensing tank, a supply tank, a three way coupling, a continuously open supply pipe between said coupling and the dispensing tank, a continuously open pipe between the main tank and coupling, a pipe leading from a source of compressed air and discharging into the said coupling, the portion of the supply pipe within the dispensing tank having openings in different horizontal planes and means associated with said pipe and adapted to be moved to cover one or more of the openings in the latter so that when the air pressure is withdrawn any gasolene in the dispensing tank above the uncovered opening in the supply pipe will drop back into the supply tank.

5. In a gasolene dispensing apparatus the combination of a graduated dispensing tank, a supply tank, a three way coupling, a continuously open pipe between said coupling and dispensing tank, a continuously open pipe between said supply tank and coupling pipe the portion of the supply pipe within the dispensing tank having openings arranged in the planes of the graduations on the tank and means associated with said supply pipe and adapted to be moved to cover and close one or more of the openings in the latter.

6. In a gasolene dispensing apparatus, the combination of a dispensing tank, a supply pipe for the same, the portion of the pipe within the tank having a plurality of openings for the escape of gasolene from the tank, means within the tank and embracing the pipe for closing one or more of the openings in the latter and a float for lifting the said closing means as the tank fills.

7. In a gasolene dispensing apparatus, the combination of a dispensing tank, a supply pipe for the same, the portion of the pipe within the tank being slotted, pneumatic means for raising the gasolene through the supply pipe to the tank, a float within the tank and means carried by the float for successively closing the slots in the supply pipe as the float rises.

8. In a gasolene dispensing apparatus, the combination with a dispensing tank, a supply pipe for the same, the portion of the pipe within the tank having a plurality of openings located in different horizontal planes, a float in said tank and means carried by said float for successively closing the openings in the pipe as the float rises.

9. In a gasolene dispensing apparatus, the combination of a dispensing tank, a supply pipe for the same, the portion of the pipe within the tank having a plurality of openings for the passage of gasolene to the tank and the escape of surplus therefrom, means within the tank and embracing the pipe for closing one or more of the openings in the latter and means for lifting the said closing means as the tank fills.

In testimony whereof I have signed this specification in the presence of two subscribing witnesses.

ABNER JUDSON McGEHEE.

Witnesses:
FRANCES G. GAINES,
MARIE C. FLETCHER.